Dec. 16, 1941.  F. C. BEST  2,266,116
MOTOR VEHICLE
Filed Feb. 25, 1938
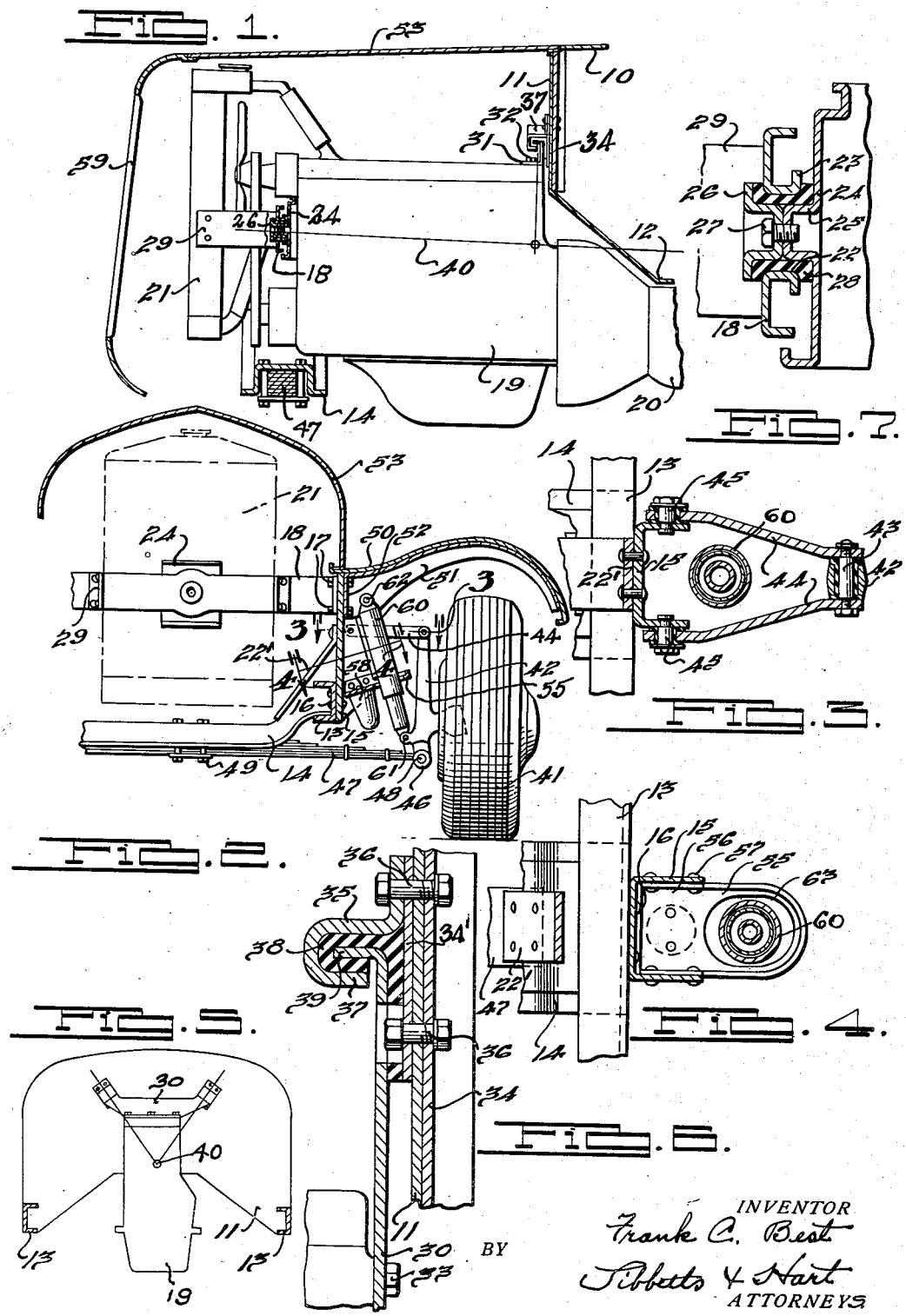
INVENTOR
Frank C. Best
BY Tibbetts & Hart
ATTORNEYS Patented Dec. 16, 1941

2,266,116

UNITED STATES PATENT OFFICE 2,266,116

MOTOR VEHICLE

Frank C. Best, Detroit, Mich., assignor to Packard Motor Car Company, Detroit, Mich., a corporation of Michigan Application February 25, 1938, Serial No. 192,569

3 Claims. (Cl. 180—64)

This invention relates to motor vehicles and more particularly to mounting structure for the power plant and the wheels of motor vehicles.

One of the objects of the invention is to provide an elevated frame structure that will serve as a mounting for the power plant, the fenders, the front wheels and the suspension bumpers at one end of a vehicle.

Another object of the invention is to eliminate one transverse member of a motor vehicle frame usually employed for supporting the power plant by utilizing the dash for such support.

Still another object of the invention is to provide a frame member that supports both the engine and its radiator and which can be removed from and assembled with the vehicle frame while the engine and radiator are applied thereto.

Still another object of the invention is to provide safety means for an independent wheel suspension in which a shock absorber associated with a pair of superposed wheel carrying links is held in relation to maintain the wheel in operative position when one of the links is broken or becomes disconnected.

Another object of the invention is to mount a complete power plant so that it can be readily assembled and disassembled from the vehicle with a minimum effort required for connection and disconnection.

Other objects of the invention will appear from the following description taken in connection with the drawing, which forms a part of this specification, and in which:

Fig. 1 is a side elevational view, partly in section, of the fore-part of a motor vehicle showing the unitary power plant and mounting therefor;

Fig. 2 is a front elevational view of a motor vehicle taken inside of the grill and with one side of the supporting means in section;

Fig. 3 is a sectional view taken on line 3—3 of Fig. 2;

Fig. 4 is another sectional view taken on line 4—4 of Fig. 2;

Fig. 5 is a diagrammatic view of the engine and its mounting;

Fig. 6 is an elevational view of a modified form of rear support for the engine, the connection to the dash being in section;

Fig. 7 is an enlargement of sectioned front mounting for the engine shown in Fig. 1.

Referring to the drawing by characters of reference, the front part of the motor vehicle body comprises the usual cowl 10, dash 11, and floor 12. Carrying the body is a main frame composed of a pair of longitudinally extending sills 13 connected by transversely extending frame members, the forward transverse member 14 being the only one shown.

At the forward end of the frame I mount an arch structure or super frame that serves as a support for a plurality of the vehicle elements. Upright channel members 15 are arranged one on each side of the frame and preferably in line with the forward transverse frame member 14, the same fastening means, such as rivets 16, being employed to secure the front transverse frame member and the bottom of the uprights to the frame sills 13. Extending between the upper ends of the uprights and detachably secured thereto by bolts 17 is a cross member 18 on which the forward end of a conventional power plant unit consisting of engine 19, transmission 20, and radiator 21 is carried. Between each end of the frame member 14 and the adjacent upright channel is secured a brace 22'.

The cross member 18 is utilized to pivotally carry the forward end of the engine and has formed therein an opening 22, the metal of the cross member being flanged as at 23 around the opening. The front cover plate 24 of the engine is formed with a projecting portion 25 arranged to extend into the opening in the cross member. A retainer 26 is formed with a projection that enters the opening 22 and abuts the forward end of the projecting portion 25 of the engine cover plate, such abutting surfaces being held together by suitable means such as bolt 27. Between the flanged metal portion 23 of the cross supporting member and the projections of the retainer and the cover plate is arranged a rubber bushing 28.

The transversely extending supporting member 18 also serves to carry the radiator 21. To this end a pair of spaced arms 29 extend forwardly from the cross member 18, and each has a flanged end fixed to the cross member by rivets. The forward ends of the arms are suitably fixed to the sides of the radiator unit.

In addition to the single pivotal support at the front of the engine, there is a rear engine suspension that is carried by the dash. As best shown in Figs. 1 and 5, there is a supporting or hanger plate 30 formed with a forwardly turned bottom flange 31 that is secured by studs 32 to the top of the rear portion of the engine, and in Fig. 6 this supporting plate 30 is attached by studs 33 to the upper rear wall of the engine. The dash 11 has reinforcing channel members 34 associated with the rear face thereof and a plate 34' associated with the front face thereof to assist in supporting the engine, and such reinforcing members and plate and supporting brackets 35 are secured to the dash by bolts 36. The brackets 35 are formed with two reversely turned flange portions 37 that provide a support for the supporting plate 30. Such flanged portions of the bracket carry suitable molded rubber members 38 into which the forwardly projecting upper arm ends 39 of the hanger plate are received. It will be seen that there are spaced points of suspension for the upper ends of the engine supporting plate arms, and together with the single forward pivotal mounting for the engine provide a three-point support to permit limited oscillation of the engine and transmission unit about the axis indicated by line 40 in Fig. 1. By utilizing the dash as a support for the power unit, a cross frame member usually utilized for this purpose is eliminated and this is desirable because the interference of such cross frame member to various elements required to be assembled beneath the vehicle body is very objectionable.

Wheels as indicated at 41 are arranged one on opposite sides of the front part of the vehicle. Each wheel is mounted on a vertically extending carrier 42 having an eye at its upper end through which a pin 43 extends. Pivotally mounted on the pin 43 is an upper suspension construction consisting of a pair of arms 44 and such arms are pivoted at their inner ends on pins 45 carried by the flanges of the adjacent upright supporting channel 15. The lower end of the carrier 42 terminates in a bifurcated eye 46 between which the end of a transversely extending leaf spring 47 extends. The spring is pivotally mounted on a pin 48 extending through the bifurcated carrier eye. The central portion of the transversely extending spring is fixed to the transversely extending frame member 14 by bolts 49.

Fenders, as indicated at 50, extend along each side of the forward end of the vehicle and are carried at their forward end by arms 51 having a vertically extending inner end 52 bearing against the outer upper end of the adjacent upright supporting member 15 and secured thereto by the bolts 17 that fasten the cross member 18 to the upright. Extending over the power unit and resting upon the fenders is the usual hood 53, and at the forward end of the vehicle is mounted the conventional grill 59.

Plates 55 extend outwardly from the upright channel supporting members 15 and are formed with flanges 56 extending parallel with the sides of the channel and secured thereto by rivets 57. Rubber bumpers 58 are suitably secured to the underside of such plates adjacent the upright members 15 and are arranged so that they will serve as an abutment limiting the upward movement of the ends of the cross leaf spring 47.

It will be noted that the front wheels are each supported by upper and lower substantially parallel link means and in order to restrict wheel movement, direct acting shock absorbers 60 are employed. The lower end 61 of such a shock absorber is pivotally connected to the carrier 42 and the upper end 62 is pivotally connected to the adjacent fender supporting arm 51. The shock absorber extends between the arms 44 of the upper link and through an opening 63 in the bumper plate 55, the bumper plate being extended for this purpose. Thus the plate 55 definitely locates the shock absorber and in the event the link structure supporting the wheel becomes broken or works loose, the shock absorber will be maintained substantially in its normal position so that the wheel will be maintained in a relation to be driven to the nearest service station for repairs. Plates 55 thus serve as a bumper support and as a safety feature for independent suspension of the type illustrated.

It will be noted that the arch structure at the forward end of the frame provides a direct support for the radiator, the engine, the spring bumper plates, the fender arms, and the upper links of the wheel suspensions, and indirectly supports the upper end of the front shock absorbers. With the construction herein disclosed, by removing the bolts 17, the transversely extending support member 18, the radiator, the engine and the transmission can be assembled with or removed from the vehicle as a unit, it being understood of course that such operations require the supporting plate 30 to be detached from the engine or the dash.

Although the invention has been described in connection with a specific embodiment, the principles involved are susceptible of numerous other applications which will readily occur to persons skilled in the art. The invention is therefore to be limited only as indicated by the scope of the appended claims

What is claimed is:

1. In a motor vehicle having an engine and a radiator, supporting means comprising a frame, oppositely disposed upstanding support members fixed rigidly to the sides of the frame, a transverse support member fixed rigidly to the upper ends of said upstanding support members, a mounting on said transverse member for the engine, and forwardly extending members on said transverse member for supporting the radiator.

2. In a vehicle having an engine in advance of the dash with its forward end mounted on the vehicle frame, a rear supporting device for the engine comprising a pair of brackets fixed to the front face of the dash, a hanger plate fixed to the rear end of the engine having flanged upstanding arms extending complementary to the brackets, said brackets having a flanged portion for receiving the flanged portions of said arms, and rubber connecting means between the flanged portions of the brackets and the flanges of the plate arms whereby to provide a resilient, pivotal mounting for the rear end of the engine.

3. In a vehicle having a dash and an engine in front of the dash mounted at its forward end on the vehicle frame, a rear supporting device for the engine comprising a pair of brackets fixed to the front face of the dash and having reversely bent flanged portions, a pair of upstanding flanged arms fixed to the rear end of the engine, said arms extending at an angle that intersects on the axis of engine oscillation, the flanged upstanding arms extending into the reversely bent flanged portions of the brackets, and rubber connecting means between the flanged portions of the brackets and the flanges of the arms whereby to provide a resilient, pivotal mounting for the rear end of the engine.

FRANK C. BEST.